Patented July 1, 1924.

1,499,761

UNITED STATES PATENT OFFICE.

DON W. BISSELL, OF BUFFALO, NEW YORK, ASSIGNOR TO NATIONAL ANILINE & CHEMICAL CO., INC., OF NEW YORK, N. Y., A CORPORATION OF NEW YORK.

PRODUCTION OF M-AMINO-BENZALDEHYDE.

No Drawing.   Application filed April 29, 1920. Serial No. 377,545.

*To all whom it may concern:*

Be it known that I, DON W. BISSELL, a citizen of the United States, residing at Buffalo, in the county of Erie, State of New York, have invented certain new and useful Improvements in the Production of m-Amino-Benzaldehyde; and I do hereby declare the following to be a full, clear, and exact description of the invention, such as will enable others skilled in the art to which it appertains to make and use the same.

This invention relates to the production of m-aminobenzaldehyde from m-nitrobenzaldehyde, by converting the m-nitrobenzaldehyde into the bisulfite compound, reducing the bisulfite compound, decomposing the bisulfite compound of the m-aminobenzaldehyde and separating the m-aminobenzaldehyde. The invention includes improvements in the production of the bisulfite compound, in the reduction thereof, and in the recovery and separation of the m-aminobenzaldehyde from the reduction product.

The invention will be further illustrated by the following more detailed description illustrating the preferred practice:

Formation of the bisulfite compound:—
80 pounds of sodium bisulfite and 250 pounds of water are introduced into a water-jacketed, steel, cone-bottom, mixing tank, 100 pounds of m-nitrobenzaldehyde added, and the mixture stirred to a thin paste. The reaction usually evolves heat and is allowed to proceed naturally until the reaction is finished. In case the reaction does not proceed of its own accord, live steam is passed into the mixture until the desired reaction takes place. The water jacket is used to prevent overheating and resulting decomposition. The mixture is stirred until all of the m-nitrobenzaldehyde is combined with the bisulfite, giving a product soluble in water. By proceeding in this way, with the use of a relatively small amount of water, and a sufficient amount of sodium bisulfite, the bisulfite compound is formed quickly and the resulting solution has relatively small bulk. This solution is then used for the reduction of the bisulfite compound of the m-nitrobenzaldehyde to the bisulfite compound of the m-aminobenzaldehyde.

Reduction:—The reduction is preferably carried out in a jacketed cast iron kettle which is fitted with an agitator and a draw-off, the jacket being adapted to withstand 60 pounds steam pressure, and being provided with both steam and cold water connections, and the kettle being provided with a tight cover having a charging man-hole and fitted with a thermometer well and with air, steam, water and vent pipes. This kettle is charged with 800 pounds of water and heated by the steam jacket to about 60° C. The agitator is then started, and 100 pounds of iron dust and five pounds of concentrated hydrochloric acid (20° Bé.) added. The solution of the bisulfite compound, produced as above described, is then added at such a rate that the temperature of the reaction mixture does not rise above 80° C. and the steam is turned off when the reaction mixture reaches this temperature. After all of the bisulfite compound is added and there is no evidence of a further rise in temperature, 50 pounds more of iron dust and 5 pounds of hydrochloric acid (of 20° Bé.) are added. The temperature should not be allowed to rise above about 90° C. and if necessary water is added to the mixture to reduce the temperature. The reaction is allowed to continue until the temperature drops of its own accord to about 70° C., and the mixture is then heated to about 90° C.

In this reduction operation, it will be noted that the amount of hydrochloric acid used is small, being only about 2.5% of that required by calculation according to the following equation:

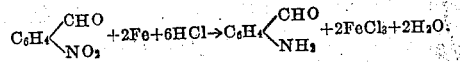

So also, the amount of hydrochloric acid is only about 1.6% of that required to dissolve the total amount of iron employed to form therewith ferrous chloride. It will be evident, therefore, that the reduction takes place in a nearly neutral medium, and that, at the end of the reduction, a relatively small amount of alkali is required for the neutralization and precipitation. The end of the reduction is accompanied by the disappearance of the odor of m-nitrobenzaldehyde in the steam from the reduction kettle, and the end of the reduction can be ascertained and controlled in this way. Instead of hydrochloric acid equivalent amounts of other acids may be used, for example, acetic or sulphuric acid.

At the end of the reduction, and while the reduction product is still hot, a sufficient amount of solid caustic soda is added to make the solution faintly alkaline to brilliant yellow test paper. A test sample of the liquor at this point should show no green color with caustic soda solution, and, if it does, more caustic soda should be added until the green is no longer present. Thorough agitation throughout the operation is important. This neutralization results in the precipitation of the iron in solution.

At the end of the reduction and neutralization, the solution is filtered hot, at about 90° C., and the filtrate is collected in a suitable receptacle, for example, in a jacketed cast iron kettle. The filtration may thus be made in a filter press, and facilitated by the introduction of air pressure on the liquid being discharged from the reducer, that is, a charge may be blown through the press by air pressure. The sludge is thus separated from the solution in the filter press, and can be blown dry with air.

The reduction of the bisulfite compound in the manner described requires a relatively short time and gives a good yield of the m-aminobenzaldehyde. Moreover, since only a relatively small amount of acid is employed, only a relatively small amount of alkali is required to precipitate the iron in solution, most of the iron being already in a precipitated form as a sludge. Accordingly, there is but a small amount of salts left in solution during the subsequent operations. The sludge itself is comparatively dense and consequently easy to handle. The operation is accordingly more advantageous than reduction operations carried out with the theoretical amount of acid required to dissolve all of the iron, where a bulky precipitate is obtained difficult to separate from the solution.

Decomposition of the bisulfite compound, and separation of the m-aminobenzaldehyde. The filtrate, together with about 52 pounds of 50° Bé. sulfuric acid, are introduced into a suitable vessel, such as a wooden vat, and heated by means of steam heated lead coils. Live steam, supplied through a lead pipe, is also introduced, with agitation of the liquid for a sufficient period of time to decompose the bisulfite and remove the sulfur dioxide. The resulting solution is then cooled by brine-cooled lead coils and then run to the filter where a red impurity is filtered off. The filtrate is collected in a suitable receptacle, such as a water jacketed cast iron kettle, containing a saturated solution of about 75 pounds of soda ash for the purpose of neutralizing the acid. Cooling water is circulated through the jacket of the kettle to remove the heat of reaction. When all the filtrate is in the kettle, the solution should be alkaline to brilliant yellow test paper. The contents of the kettle are stored overnight, during which period the m-aminobenzaldehyde precipitates out. The solution and its contents are then blown through a filter press. The m-aminobenzaldehyde is thus obtained in a form well adapted for further treatment or use, or it can be dried where a dry product is desired.

The specific proportions and conditions given in the preceding specific description are capable of some variation. For example, the amount of water used in the production of the bisulfite compound may be somewhat reduced, while other conditions can be somewhat varied. The following specific example will further illustrate the invention, and certain of the variations therein:

125 pounds of m-nitrobenzaldehyde, 100 pounds of sodium bisulfite and 200 pounds of water are agitated with little heating in an apparatus of the character above described until a complete solution is effected. 90 pounds of iron dust and 6 pounds of hydrochloric acid (20° Bé.) are mixed thoroughly with a little water and added to 125 pounds of water in a suitable tank and agitated therein for about fifteen minutes with slight heating. Water is added to the iron and acid to make the charge up to about 800 pounds and the mixture is heated to about 45° C. The clear solution of the bisulfite compound of m-nitrobenzaldehyde is then run in, the resulting charge being about 1550 pounds, and more water being added if necessary to bring the charge up to this amount. The mixture is then heated very slowly to about 60° C., a mixture of 31 pounds iron dust and 3 pounds hydrochloric acid then added, and the mixture heated gradually to about 76° C., this last heating usually being effected by the heat of reaction. The charge is kept at about 80° C. for about one and one-quarter hours. A mixture of 31 pounds of iron dust and 2½ pounds hydrochloric acid is then added and the charge heated gradually to about 86° C. and kept there for about one hour. The mixture is then made neutral or very slightly alkaline with caustic soda, heated to about 85–90° C. and filtered through a filter press. The filtrate, in a suitable vat equipped with steam heating coils, is admixed with 150 pounds of hydrochloric acid and the mixture boiled vigorously for about 20 minutes, then cooled to about 10° C. and filtered and the filtrate received in a kettle containing about 93 pounds of soda ash. After neutralization about ten pounds of caustic soda are added to promote or complete the precipitation of the m-aminobenzaldehyde, which is then separated from the mixture by filtering, and is dried in the air.

This specific method of procedure is similar to that described above, and presents similar advantages, in that it enables the bisulfite compound to be produced quickly and with little bulk, and enables the reduction and subsequent separation to be effected with advantages similar to those above described.

I claim:

1. The method of reducing the bisulfite compound of meta-nitrobenzaldehyde, which comprises subjecting the same in aqueous solution to the action of iron and an amount of acid sufficient to combine with about 1% to 2% of the iron.

2. The method of reducing the bisulfite compound of meta-nitrobenzaldehyde, which comprises gradually adding an aqueous solution of the bisulfite compound to an aqueous mixture containing iron and an amount of acid sufficient to dissolve only a small part of the iron, and maintaining the temperature between about 60° and 90° C. during the addition.

3. The method of reducing the bisulfite compound of meta-nitrobenzaldehyde, which comprises subjecting a solution of the same to the action of iron in a medium containing not more than about 1% by weight of hydrochloric acid and at a temperature between about 60° and 90° C.

4. The method of reducing the bisulfite compound of meta-aminobenzaldehyde, which comprises gradually adding a solution of such bisulfite compound to a reducing agent consisting of iron and an amount of hydrochloric acid sufficient to combine with not more than about 5% of the iron, and maintaining the temperature below about 80° C., and completing the reduction by the addition of further amounts of iron and corresponding proportions of hydrochloric acid, and finally raising the temperature to about 90° C. to complete the reduction.

5. The method of reducing the bisulphite compound of meta-nitro-benzaldehyde which comprises subjecting the same in an aqueous solution in concentration of not over 10% of m-nitrobenzaldehyde to the action of iron and an amount of acid sufficient to combine with not more than 5% of the iron.

6. The method of producing the bisulfite compound of meta-aminobenzaldehyde, which comprises reducing the bisulfite compound of meta-nitrobenzaldehyde with iron in the presence of acid, the amount of acid being such that at the completion of the reduction the major part of the iron compounds thereby produced remain undissolved.

7. The method of producing the bisulfite compound of meta-aminobenzaldehyde, which comprises reducing the bisulfite compound of meta-nitrobenzaldehyde in aqueous solution in the presence of sodium bisulfite by the action of iron at a temperature of about 45° to 90° C. in the presence of hydrochloric acid of a strength not to exceed about 1 per cent, the amount of hydrochloric acid being such that at the completion of the reduction the major part of the iron compounds therein produced remain undissolved.

8. The method of reducing the bisulfite compound of meta-nitrobenzaldehyde to produce the bisulfite compound of meta-aminobenzaldehyde, which comprises adding an aqueous solution of the bisulfite compound of meta-nitrobenzaldehyde which contains of uncombined sodium bisulfite to an aqueous mixture containing iron and hydrochloric acid at a temperature of about 45° to 60° C., the strength of the hydrochloric acid being about 0.15 to 0.3 per cent and its amount being such that at the completion of the reduction the major part of the iron compounds therein produced remain undissolved, and subsequently raising the temperature to about 70° to 85° C., at which temperature the reduction is brought to completion.

9. In the production of the bisulfite compound of meta-aminobenzaldehyde by subjecting the bisulfite compound of meta-nitrobenzaldehyde in solution to the action of iron in the presence of an acid, the step characterized by the employment of an amount of acid such that at the completion of the reduction a major part of the iron compounds produced in the reaction remain undissolved.

10. In the reduction of the bisulfite compound of meta-nitrobenzaldehyde by means of iron and hydrochloric acid to produce the bisulfite compound of meta-aminobenzaldehyde, the step characterized by the employment of a total amount of hydrochloric acid not exceeding about 5 per cent of that required to dissolve the total iron present.

11. In the reduction of the bisulfite compound of meta-nitrobenzaldehyde by means of iron and hydrochloric acid, the step characterized by the employment of about 1.5 to 2 per cent of the amount of hydrochloric acid required to dissolve the total iron present.

12. In the reduction of the bisulfite compound of meta-nitrobenzaldehyde by means of iron in the presence of an amount of hydrochloric acid not to exceed 5 per cent of that required to dissolve the total iron present, the step characterized by the employment of hydrochloric acid having an original strength not to exceed about 1 per cent.

13. In the reduction of the bisulfite compound of meta-nitrobenzaldehyde by means of iron in the presence of hydrochloric acid having a strength not exceeding 1 per cent, and in amount sufficient to dissolve not more than 5 per cent of the total iron present, the step characterized by effecting the reduction at a temperature between 45° C. and 90° C.

14. In the reduction of the bisulfite compound of meta-nitrobenzaldehyde by means of iron in the presence of an amount of hydrochloric acid of not in excess of 2% of that required to dissolve the total iron present, the step characterized by the employment of hydrochloric acid having an original strength of about 0.15% to 0.3%.

In testimony whereof I affix my signature.

DON W. BISSELL.